Jan. 27, 1925.  1,524,290

H. S. COBURN ET AL

COTTON HARVESTING MACHINE

Filed Sept. 7, 1920 7 Sheets-Sheet 1

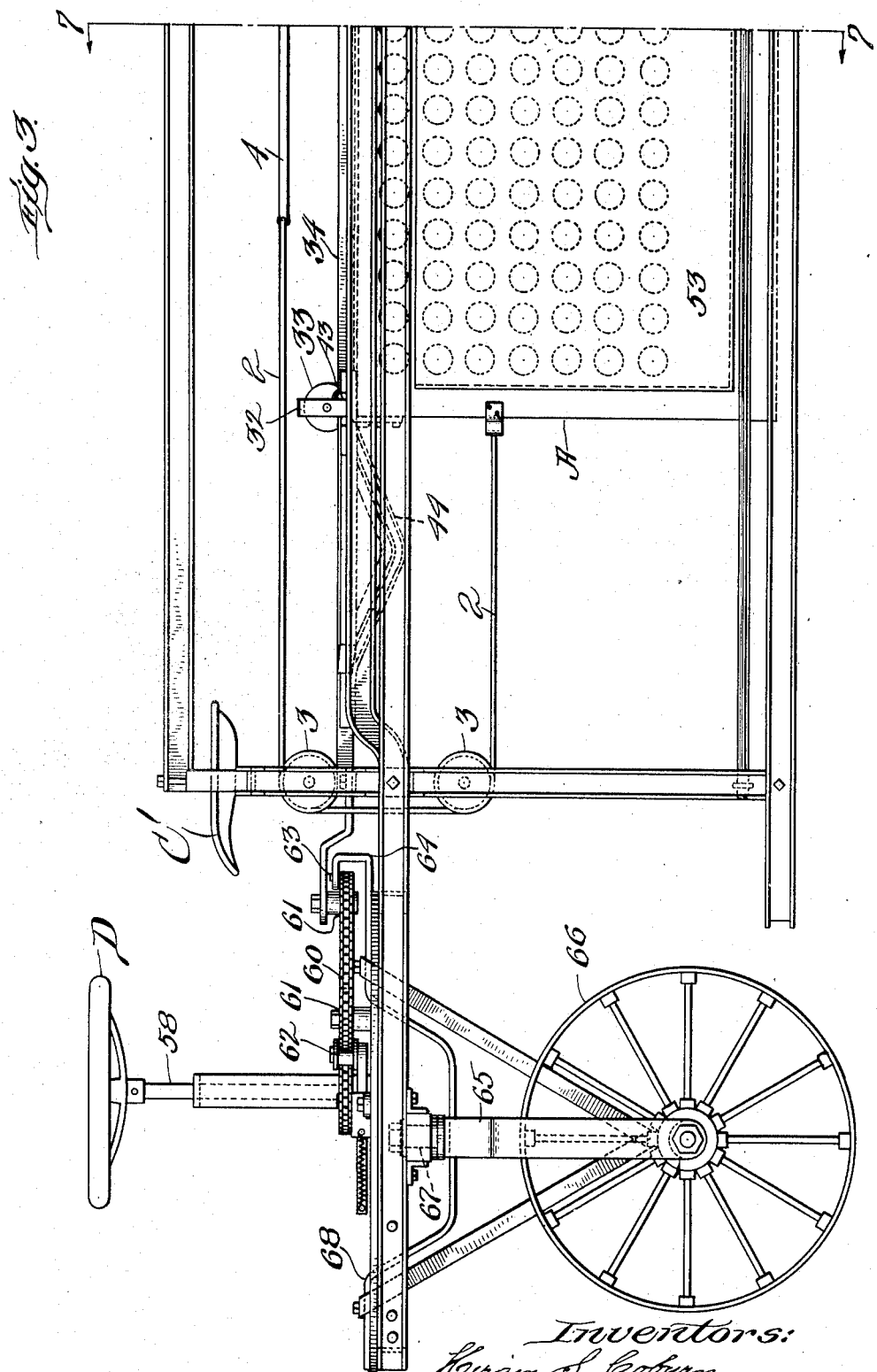

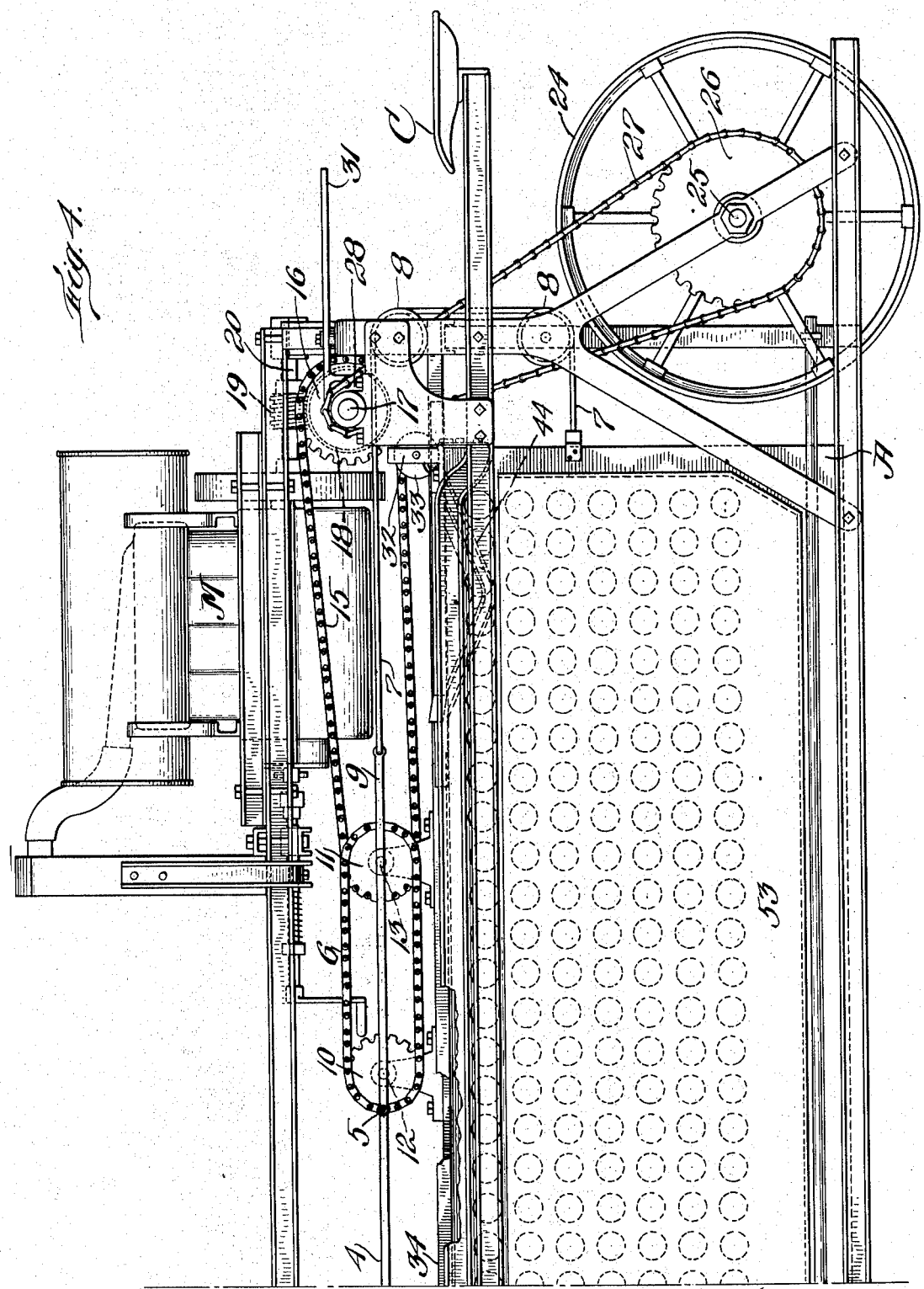

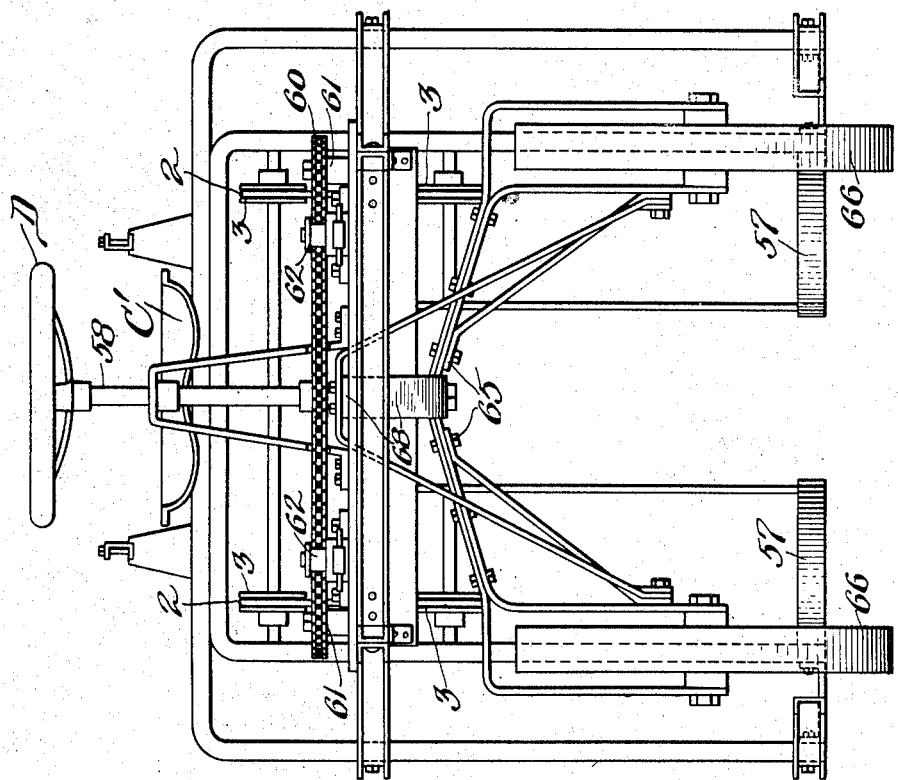

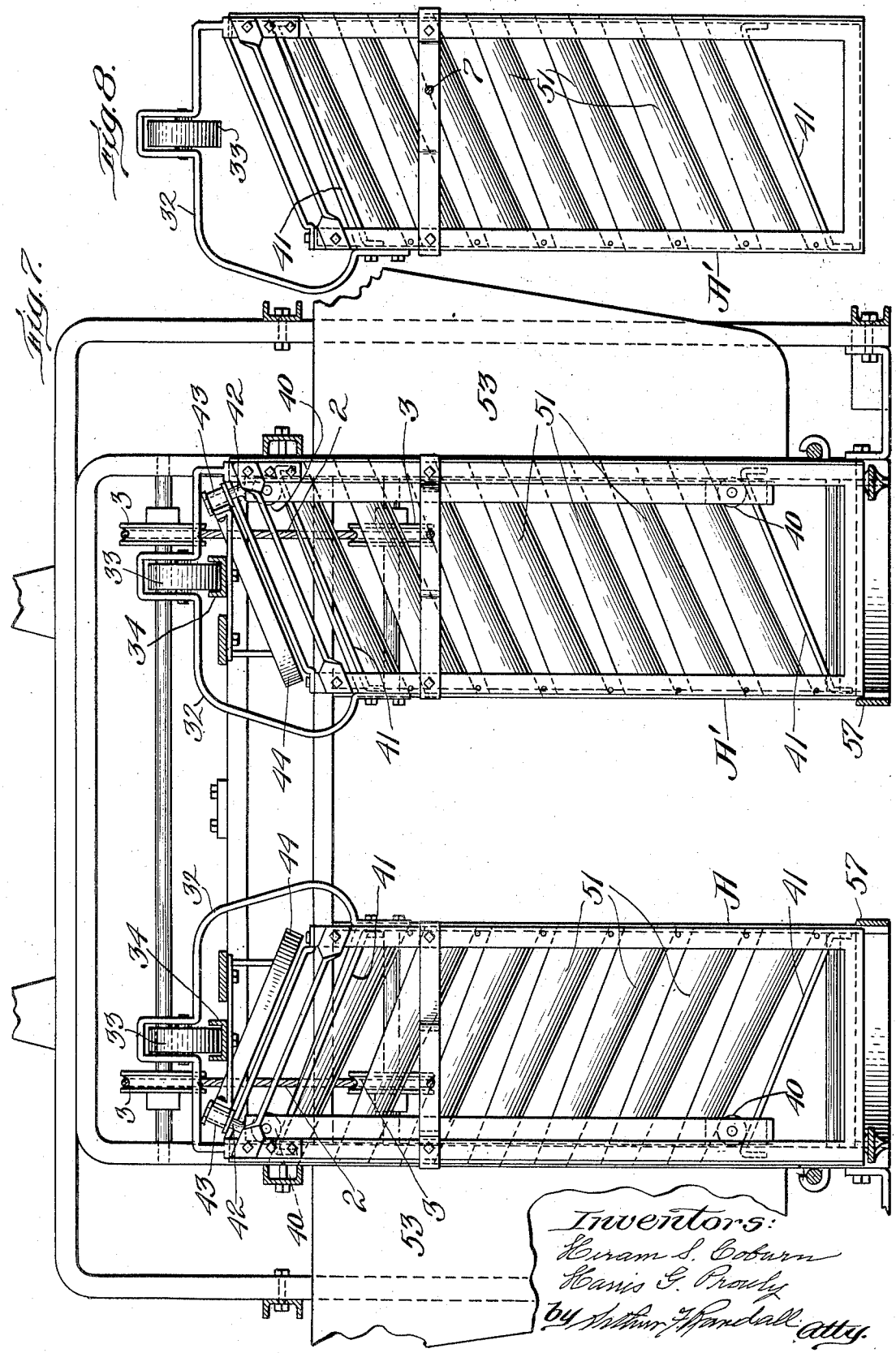

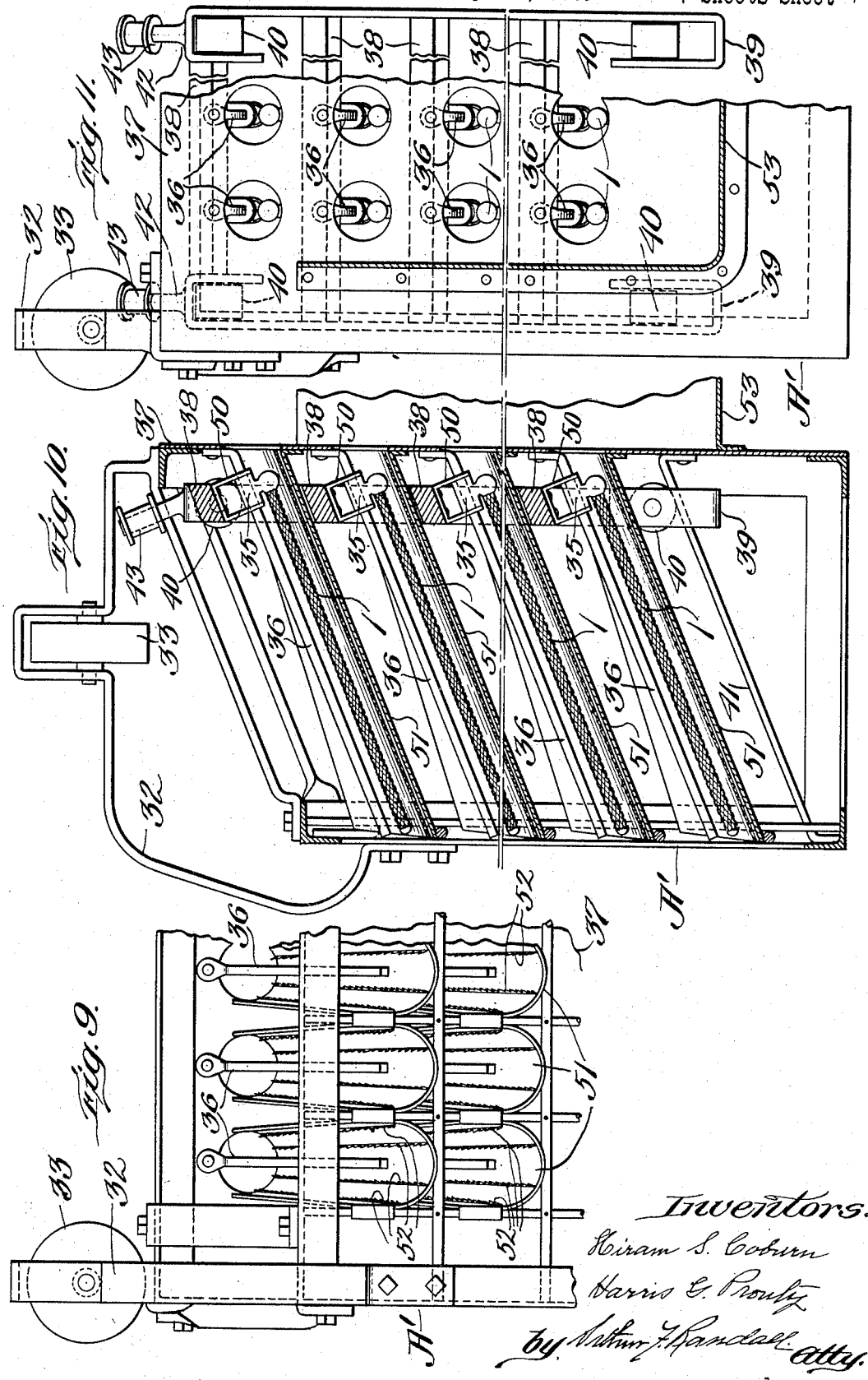

Patented Jan. 27, 1925.

1,524,290

UNITED STATES PATENT OFFICE.

HIRAM S. COBURN, OF MALDEN, AND HARRIS G. PROUTY, OF WHITMAN, MASSACHUSETTS, ASSIGNORS TO THE COBURN COTTON HARVESTER COMPANY, OF BOSTON, MASSACHUSETTS, A CORPORATION OF ARIZONA.

COTTON-HARVESTING MACHINE.

Application filed September 7, 1920. Serial No. 408,612.

*To all whom it may concern:*

Be it known that we, HIRAM S. COBURN and HARRIS G. PROUTY, both citizens of the United States, residing, respectively, at Malden, in the county of Middlesex, and at Whitman, in the county of Plymouth, both in the State of Massachusetts, have invented certain new and useful Improvements in Cotton-Harvesting Machines, of which the following is a specification.

Our invention relates to cotton harvesting machines and it has for its object to provide an improved machine of this kind.

Our invention is a cotton harvesting machine adapted to be moved about over a cotton field and to operate automatically to remove the cotton from the plants, one of the distinguishing features thereof consisting in providing the machine with a multiplicity of picker elements, preferably picker rods, such for example, as shown and described in U. S. Letters Patent granted to Hiram S. Coburn Oct. 5, 1909, Number 936,236, which are constructed with barbs or prongs for engaging the cotton. In our improved machine these rods are movably supported upon the frame thereof and actuated so as to travel forward with relation to the ground intermittently, or step by step, and during each period of rest with relation to the ground the rods are moved axially on the frame in a direction crosswise of the travel of the machine over the ground, so that the rods are at such times thrust into and withdrawn from the plants, the barbs or prongs on said rods engaging and picking up the cotton which is thereby pulled from the plants. Suitable means are provided for removing or doffing the cotton from the picker rods.

Other features of our invention are hereinafter pointed out.

In the accompanying drawings:

Figure 1 is a plan view of the front end portion, and Figure 2 a plan view of the rear end portion, of a cotton harvesting machine constructed in accordance with our invention, these two figures when joined together constituting a complete plan view of the machine. Figure 3 is a side elevation of the portion of the machine shown in Figure 1, and Figure 4 is a side elevation of the portion of the machine shown in Figure 2, these two Figures 3 and 4, when joined together, constituting a complete side elevation of the machine. Figure 5 is an elevation of the front end of the machine. Figure 6 is a plan view of one of the latch cams hereinafter referred to. Figure 7 is a section on line 7, 7, of Figure 3, but with the two picker carriers, hereinafter referred to, in elevation.

Figure 8 is an end elevation of one of the picker carriers.

Figures 9, 10 and 11 are details illustrating the construction of the picker carriers.

Figure 1:
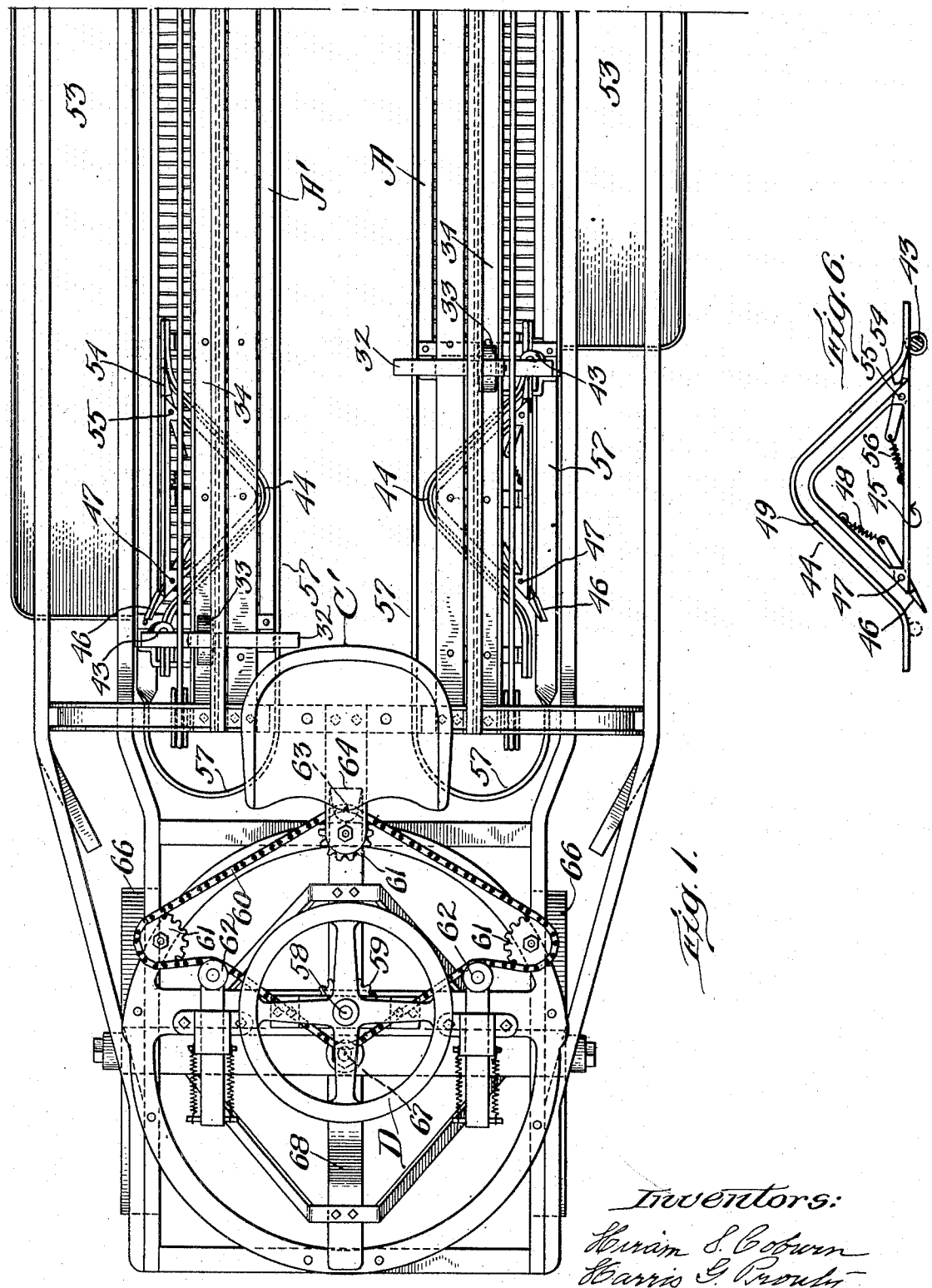
Figure 2:
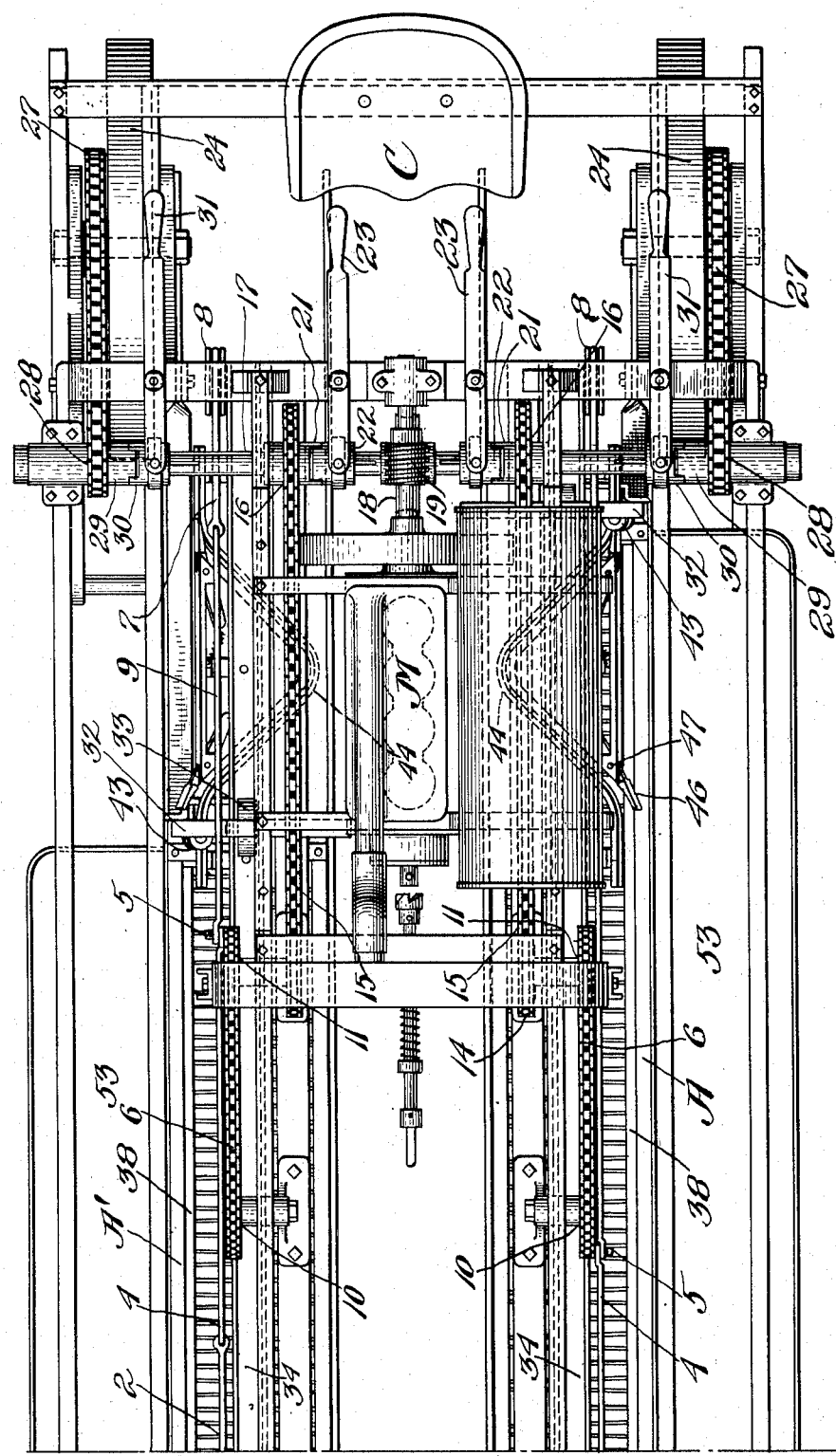

In our improved machine as herein shown there are provided two carriers A, A', on each of which is mounted a multiplicity of picker elements herein shown as rods 1, which may be constructed as shown and described in the patent to Coburn referred to above. These two carriers are mounted upon the frame of the machine, one at each side thereof, and are separated so as to leave between them a passageway for the cotton plants. When the machine is in operation it is propelled over the ground by means of an internal combustion engine M, which may be controlled by an operator from his position upon a seat C. At the front end of the machine is provided another seat C' for an operator who, by means of a steering wheel D, directs the course of the vehicle.

At its front end each carrier A, A', has connected with it one end of a cable 2 which extends forwardly around two sheaves 3 on the frame of the machine and thence rearwardly to a link 4 to which its other end is fastened. This link 4 connects the cable 2 with a wrist pin 5 projecting from an endless chain 6. At its rear end each carrier A and A' has connected to it one end of another cable 7 which extends around two sheaves 8 on the frame of the machine and thence forwardly to a link 9 to which its other end is fastened. This link 9 connects the cable 7 with the wrist pin 5 on the endless chain 6. The endless chain 6 is supported by two sprockets 10 and 11 fast on shafts 12 and 13 respectively, journaled in brackets secured to the frame of the machine. The shaft 13 also carries a sprocket wheel 14 connected by an endless chain 15 with a sprocket 16 fast on the main shaft 17 of the machine. The main shaft 17 has a worm gear 18 fast thereon that is continuously driven by a worm 19 fast on the crank shaft 20 of engine M. One face of each sprocket 16 is made with a clutch member 21 to co-operate with a clutch member 22 splined to shaft 17, each member 22 being moved into and out of engagement with its member 21 manually by means of a hand lever 23 fulcrumed on the frame of the machine. When clutch members 22 and 21 are interlocked the endless chain 15 thereof is continuously driven, and through the connections described said chain acts to reciprocate its carrier A or A' on the frame of the machine longitudinally thereof, the speed of the chain 6 being the same as the speed of the movement of the vehicle over the ground, with the result that during each rearward movement of each carrier on the frame said carrier is held at rest with relation to the ground, for the reason that the carrier is moved rearward on the frame of the machine at the same speed that the latter travels forward over the ground.

The frame of the machine is supported at its rear end by two wheels 24 each journaled on a short axle 25 mounted on the frame of the machine. Compounded with each wheel 24 is a sprocket 26 connected by a chain 27 with a sprocket 28 loose on main shaft 17. One face of each sprocket 28 is made with a clutch member 29 co-operating with a clutch member 30 splined on shaft 17. Each clutch member 30 is shifted into and out of engagement with its member 29 by means of a hand lever 31 fulcrumed on the frame of the machine and within reach of the operator upon the seat C. The clutch members 29—30 are provided in lieu of a differential connection between the two rear driving wheels, both wheels being connected with the main shaft 17 while traveling a straight course, and one or the other being disconnected therefrom in negotiating turns.

The driving wheels 24 and the mechanism through which they are driven from shaft 17 are constructed and arranged so as to move the vehicle forward over the ground at the same speed as that at which the wrist pin 5 moves back and forth with the endless chain 6. Preferably the clutches 21—22 are set so that the two carriers A and A' are reciprocated simultaneously but in opposite directions, that is, they move back and forth alternately.

Each picker carrier A and A' is made near its front and rear ends, respectively, with upwardly extending bail-shaped brackets 32 carrying rolls or trucks 33 which rest upon the top side, and within the channel of, a channel iron bar 34 that is part of the frame of the machine, said bar 34 serving to both support the carrier and to hold its upper end against lateral displacement.

The pickers 1 of each carrier A and A' are arranged in a number of horizontal and vertical rows, and immediately above each horizontal row of pickers is a bar 38, all of said bars 38 being rigidly connected at their ends to two upright bars 39. Each upright bar 39 is provided near its upper and lower ends with trucks or rolls 40 resting upon rails 41 which are part of the carrier-frame. Also each upright 39 is provided at its upper end with a stud 42 carrying a roller 43 which rests against and co-operates with a latch cam 44 fastened immovably to the frame of the vehicle. Four of the latch cams 44 are provided on the frame of the machine, two for each carrier A and A'.

During the back and forth movements of each picker carrier on the frame of the machine the upright bars 39 thereof, together with their horizonal bars 38 travel back and forth with the picker carrier and the rolls 43 are thereby caused to traverse the cams 44. During the forward movement of each picker carrier the two rolls 43 thereof travel in a straight path along the straight sides 45 of the cams 44 with which they co-operate, and at the end of the forward movement of the picker carrier these two rolls are in positions forward of two normally open latches 46 forming part of the two cams 44 of said carrier. These latches 46 are pivoted at 47 and held normally open by springs 48. It will be clear, therefore, that when the picker carrier is moved rearward on the frame of the machine and is stationary with relation to the ground, the cams 44 are moving forward with the vehicle, with the result that the cam rolls 43 are directed by the latches 46 into the laterally extending cam grooves 49 of the cams 44. As the cam rolls pass through these grooves the two end uprights 39 and their connecting cross bars 38 are moved sidewise toward the center of the machine and back again. As shown in Figure 10 the laterally extending arm 35 of each picker 1 is engaged at opposite side thereof by a yoke 50 secured to the adjacent cross bar 38, so that when the latter is moved toward the center of the machine and back again by cams 44, as just described, these yokes slide the pickers 1 forward on their supporting arms 36, causing them to be projected from the picker carrier into the cotton plants and then withdrawn therefrom. Each picker, as shown in the Coburn patent above referred to, is made with rearwardly projecting barbs so that only during its retracting, or return, movement under the influence of cams 44 does it engage the cotton and pull the same from plants.

Each picker 1 is partially housed within a sheet metal trough 51, forming part of the picker carrier frame, and upon its interior this trough is provided with rearwardly facing barbs 52. It therefore happens that each time the picker is retracted the cotton pulled from the plant by it is drawn freely into the trough of the picker, but when the picker is again moved forward out of its trough 51 the barbs 52 prevent the cotton from moving out with the picker. The cotton accumulating within each trough 51 is eventaually forced or crowded toward the outer end of the latter through repeated movements of the picker and finally discharges from said outer end into a basket or other receiver 53 secured to the picker carrier frame upon the outer side thereof.

As each cam roll 43, moving rearwardly along its cam groove 49, passes out of the rear end of the latter it idly pushes aside a latch 54 that normally closes said end. This latch 54 is pivoted at 55 and normally held closed by a spring 56. The cam roll 43 moves rearwardly beyond latch 54 so that when said cam roll is again moved forward it is held against entering cam groove 49 by latch 54 which bridges and closes the rear end of said cam groove. Thus only during the rearward movement of the cam rolls 43 do they enter cam grooves 49.

The two rear wheels 24 are mounted upon two short axles 25 on the frame of the vehicle, one at each side thereof, so that the cotton plants can pass, without interference, between them.

Guide rails 57, forming part of the frame of the vehicle, guide or direct the plants properly between the two picker carriers A and A' as the vehicle moves along the row of plants.

Near its forward end the frame of the vehicle has journaled thereon an upright post 58 on the upper end of which the wheel D is mounted. This post 58 has fast to its lower end a sprocket wheel 59 engaging an endless chain 60, which also extends around supporting and guiding sprockets 61 journaled on studs projecting from the frame of the vehicle. Spring pressed take-up rolls 62 maintain the chain taut. This chain is connected at 63 to an arm 64, forming part of a yoke 65, each arm of which latter is forked and straddles a wheel 66. This yoke 65 is pivotally connected at 67 to the frame of the vehicle, and, as will be clear, rotation of the post 58 acts through the sprocket chain 60 and arm 64 to swing the yoke on the pivot 67 to direct the course of the vehicle over the ground. The arm 65 to which the sprocket chain is connected also acts in conjunction with another forwardly extending arm 68 to support the yoke 65 against side thrust fore and aft.

In the preferred form of our invention the group of picker elements on each carrier A and A' is in length twice the length of each forward step movement of the carrier, or substantially that, in order that the plants of the row shall be operated upon twice during the travel of the machine along the row. Thus if the throw of wrist pin 5 is two feet and it moves from one extreme of its throw to the opposite while the vehicle travels forward two feet then the total length of each forward step movement of either carrier A or A' is four feet so that if the group of picker elements of the carrier is eight feet long the plants of the row will be operated upon twice during the movement of the vehicle along the row.

It is not essential that the wrist pin 5 travel back and forth at exactly the same speed as that at which the vehicle moves forward as a small difference in this particular would not result in any substantial sidewise displacement or dragging of the picker elements while they are projected into the plants.

What we claim is:

1. A cotton harvesting machine comprising a portable frame adapted to be moved along a row of cotton plants; a multiplicity of picker elements movably mounted upon said frame; means for shifting said picker elements back and forth on said frame to cause said elements to move forward intermittently relatively to the ground and said row; means for reciprocating said picker elements during each period of rest between forward movements thereof to cause said elements to move into and out of engagement with the plants of said row, and stripping means carried by said frame that is caused to engage and remove the cotton from said picker elements by the reciprocating movements of the latter.

2. A cotton harvesting machine constructed in accordance with claim 1 wherein the stripping means consists of a trough for each picker element provided upon its interior with cotton engaging barbs disposed to engage the cotton and prevent movement thereof with the picker element when the latter is moved toward the plants, the cotton removed from the plants by the picker element being carried by the latter into said trough when said element moves away from the plants.

3. A cotton harvesting machine comprising a vehicle frame adapted to be moved along a row of cotton plants; a picker carrier mounted upon said vehicle frame with provision for backward and forward movement thereon; a multiplicity of picker elements mounted upon said carrier frame with provision for endwise movement transversely of the direction of travel of said vehicle frame; means for moving said carrier frame backwards and forwards on said vehicle frame to cause said carrier frame to move forward intermittently along said row, and means through which the relative movement between said carrier frame and said vehicle frame occasions endwise reciprocating movement of said picker elements to move the latter into and out of the plants during each period of rest between forward movements of said carrier frame.

4. A cotton harvesting machine comprising a portable frame adapted to be moved along a row of cotton plants; a carrier mounted upon said frame and movable longitudinally thereof; means for shifting said carrier on said frame to cause it to travel intermittently forward relatively to said row as said frame traverses the latter; a multiplicity of picker rods movably mounted upon said carrier; means for shifting said picker rods axially on said carrier in a direction crosswise of the direction of travel of said carrier so as to move said picker rods into and out of engagement with said plants during each interval of rest of said carrier, said operating means including an actuator mounted upon said carrier and engaging said picker rods and a one-way latch cam on said frame for operating said actuator, and means for removing the picked cotton from said picker rods.

5. A cotton harvesting machine comprising a portable frame adapted to be moved along a row of cotton plants; a carrier mounted upon said frame and movable longitudinally thereof; means for shifting said carrier on said frame to cause it to travel intermittently forward relatively to said row as said frame traverses the latter; a multiplicity of picker rods movably mounted upon said carrier; means for shifting said picker rods axially on said carrier so as to move said picker rods into and out of engagement with said plants during each interval of rest of said carrier, said operating means including an actuator mounted upon said carrier and engaging said picker rods and a pair of one-way latch cams on said frame acting upon opposite ends of said actuator to shift the latter transversely on said carrier, and means for removing the picked cotton from said picker rods.

In testimony whereof we have affixed our signatures.

HIRAM S. COBURN.
HARRIS G. PROUTY.